US009327228B2

(12) United States Patent
Hegemann (10) Patent No.: US 9,327,228 B2
(45) Date of Patent: May 3, 2016

(54) VENTURI SCRUBBER FOR WET DEDUSTING AND HAVING AN INSERT BODY (75) Inventor: Karl-Rudolf Hegemann, Essen (DE)

(73) Assignee: SIEMENS VAI METALS TECHNOLOGIES GMBH (AT)

( * ) Notice: Subject to any disclaimer, the term of this patent is extended or adjusted under 35 U.S.C. 154(b) by 217 days.

(21) Appl. No.: 14/127,475

(22) PCT Filed: Jun. 20, 2012

(86) PCT No.: PCT/EP2012/061815
§ 371 (c)(1),
(2), (4) Date: Dec. 18, 2013

(87) PCT Pub. No.: WO2012/175550
PCT Pub. Date: Dec. 27, 2012

(65) Prior Publication Data
US 2014/0137745 A1 May 22, 2014

(30) Foreign Application Priority Data
Jun. 20, 2011 (DE) .......................... 10 2011 105 409

(51) Int. Cl.
B01D 47/10 (2006.01)

(52) U.S. Cl.
CPC ............ *B01D 47/10* (2013.01); *B01D 2247/08* (2013.01)

(58) Field of Classification Search
CPC ............................ B01D 47/10; B01D 2247/08
USPC ........................... 96/256, 272, 273, 275, 323; 261/DIG. 54, DIG. 56
See application file for complete search history.

(56) References Cited

U.S. PATENT DOCUMENTS

| 3,284,064 | A |   | 11/1966 | Kolm et al. |              |
|-----------|---|---|---------|-------------|--------------|
| 3,638,925 | A | * | 2/1972  | Braemer     | B01D 47/10   |
|           |   |   |         |             | 138/46       |
| 3,854,908 | A | * | 12/1974 | Hausberg    | C21B 7/007   |
|           |   |   |         |             | 261/116      |
| 4,023,942 | A | * | 5/1977  | Brady       | B01D 47/10   |
|           |   |   |         |             | 261/112.1    |
| 4,260,563 | A |   | 4/1981  | Brulhet     |              |
| 4,375,439 | A | * | 3/1983  | Hegemann    | B01D 47/10   |
|           |   |   |         |             | 261/62       |

FOREIGN PATENT DOCUMENTS

DE  24 10 591   7/1975
GB     809378   2/1959

OTHER PUBLICATIONS

International Search Report dated Sep. 26, 2012 issued in corresponding International patent application No. PCT/EP2012/061815.
International Preliminary Report on Patentability dated Sep. 10, 2013 issued in corresponding International patent application No. PCT/EP2012/061815.

* cited by examiner

*Primary Examiner* — Frank Lawrence
(74) *Attorney, Agent, or Firm* — Ostrolenk Faber LLP (57) ABSTRACT

A venturi scrubber, which has a flow channel defined by a confuser, a throat, and a diffuser in sequence and which has a longitudinal axis. The throat has a throat wall, with nozzles for injecting scrubbing liquid into the throat. At least one insert body in the throat reduces the flow cross-section in the flow channel by at most 45%, preferably at most 30%, especially preferably at most 20%. The insert body is located preferably in a region of the longitudinal extension of the throat after the nozzles, as viewed in the direction from the confuser to the diffuser.

17 Claims, 7 Drawing Sheets

FIG 1

Prior Art

FIG 2

Prior Art

VENTURI SCRUBBER FOR WET DEDUSTING AND HAVING AN INSERT BODY

CROSS-REFERENCE TO RELATED APPLICATIONS

The present application is a 35 U.S.C. §§371 national phase conversion of PCT/EP2012/061815, filed Jun. 20, 2012, which claims priority of German Patent Application No. 10 2011 105 409.3, filed Jun. 20, 2011, the contents of which are incorporated by reference herein. The PCT International Application was published in the German language.

TECHNICAL FIELD

The invention relates to a venturi scrubber for wet dedusting of a dust-laden stream of gas, in particular converter gas, comprising a flow channel having a constriction in the form of a throat and nozzles for injecting a scrubbing liquid into the flow channel. The throat of the venturi scrubber having a flow channel is defined by a confuser, a throat and a diffuser and has a longitudinal axis and also has a throat wall in which nozzles for injecting scrubbing liquid into the throat are present.

PRIOR ART

Wet separators for fine dusts and aerosols of industrial emissions are frequently used apparatus in waste gas cleaning technology. According to VDI guideline 3679, wet separators are classified into four main design types, specifically column scrubbers, vortex scrubbers, rotation scrubbers and venturi scrubbers. The separation rates achieved by venturi scrubbers, even for particles having a very small diameter, are very high compared with the other design types.

Viewed in the flow direction of a gas stream requiring to be cleaned (and hence in the direction of its longitudinal axis, since a gas stream usually flows in the direction of the longitudinal axis of the venturi scrubber because the flow channel of the venturi scrubber extends along the longitudinal axis), a conventional venturi scrubber according to the prior art comprises, in sequential order, a confuser, a throat and a diffuser. The throat is a constriction of the flow channel.

An entering dust-laden gas stream is accelerated in the confuser of the flow channel and attains its highest velocity in the narrowest cross-section of the flow channel, the throat.

In the throat, a scrubbing liquid is injected as a jet perpendicularly to the flow direction of the gas stream requiring to be cleaned in a technique also known as lateral injection. The injection is by a plurality of nozzles. These are implemented for example as small nozzle apertures which are arranged adjacent to one another in a plane at right angles to the longitudinal axis of the flow channel, also known as the injection plane.

In the succeeding diffuser, kinetic energy of the gas stream is converted back into pressure energy again, although due to friction losses in the two-phase flow, this is less than the theoretical pressure recovery.

The impact force of the gas causes the scrubbing liquid to be atomized into ultrafine droplets in the throat. The separation rate increases as the velocity of the gas in the throat, known as the throat velocity, increases. This increase is due to the increase in relative velocity between the gas or, as the case may be, particles to be separated, and the scrubbing liquid and to the formation of larger interfacial surfaces between the gaseous and liquid phases.

An increase in the separation rate with increasing scrubbing liquid-to-gas ratio is likewise a product of the enlarged interfacial surface between gaseous and liquid phase. Using more scrubbing liquid usually increases the separation rate. The separation rate is defined as the ratio of the dust content remaining in the gas stream after passing through a dedusting apparatus, known as the outlet dust content, to the dust content present in the gas stream prior to its passage through the dedusting apparatus, known as the inlet dust content:

Separation rate $\eta$ (in %)

$$\eta = ((\text{inlet dust content} - \text{outlet dust content})/\text{inlet dust content}) * 100\%$$

In the conventional venturi scrubber employing lateral injection, the penetration depth of the scrubbing liquid into the flow channel of the throat plays a critical role in the separation rate, since the venturi scrubber's separation rate is reduced if the penetration depth of the jet of scrubbing liquid is either too great or too low. If the penetration depth is too great, the scrubbing liquid impinges onto the throat wall sections disposed opposite the corresponding nozzle and runs down there as a film. If the penetration depth is too low, a zone forms in the center of the throat into which no scrubbing liquid penetrates, and through which the gas stream containing particles to be collected can pass through the scrubber without coming into contact with the scrubbing liquid.

Furthermore, there are gaps between the nozzles in the injection plane, which are unavoidable for structural and functional reasons. The gaps also lead to zones into which, because of the geometry of the arrangement of the nozzles and the spray pattern of the nozzles (a jet of the scrubbing liquid outlet nozzle aperture of the nozzle spreads out as a full-cone jet), none of the scrubbing liquid ejected from the nozzles can enter, and in which the gas stream containing particles to be collected can pass through the scrubber without coming into contact with the scrubbing liquid.

It is also important to note that strong acceleration of the scrubbing liquid and a consequent rapid decrease in the relative velocity between scrubbing liquid and gas stream or, as the case may be, particles to be collected in the gas stream, is effected if the scrubbing liquid offers a large surface for interaction with the gas stream. After just a short distance of travel after the scrubbing liquid exits the nozzles until the gas stream together with entrained scrubbing liquid exits the throat, the scrubbing liquid has accelerated so strongly in the direction of the magnitude of the velocity of the gas stream, and consequently the relative velocity between the phases has decreased to such an extent, that the scrubbing liquid subsequently experiences only a slight increase in velocity in the ensuing flow region. For a given geometry of the venturi scrubber and due to load fluctuations, operating points exist which deviate significantly from the optimal operating point and at which a correspondingly lower separation rate is achieved.

The actual separation of particles, such as dust, from the gas stream, for example the mass transfer of the particles from the carrier gas's gas stream to the scrubbing liquid, takes place only by way of scrubbing liquid or droplet precipitation, causing the separation of gaseous and liquid phase.

With known venturi scrubbers, for example ones used in converter gas cleaning in converter plants of steelworks in the charging period and the subsequent blowing period, separation rates are achieved at which the scrubbed converter gas typically has on average over the entire period a clean gas dust content of approximately 140 or 150 mg/m³$_n$. In order to comply with statutory environmental provisions, filters are typically positioned downstream of traditional venturi scrubbers in order to reduce the clean gas dust content further.

SUMMARY OF THE INVENTION

Technical Problem

The object underlying the present invention is to achieve an improvement in the separation rate in venturi scrubbers with throat.

Technical Solution

This object is achieved by means of a venturi scrubber having a flow channel defined by a confuser, a throat and a diffuser, and having a longitudinal axis, wherein the throat has a throat wall in which nozzles for injecting scrubbing liquid into the throat are present. There is present in the throat at least one insert body which reduces the flow cross-section in the flow channel by at most 45%, preferably at most 30%, particularly preferably at most 20%. The insert body is preferably located after the nozzles in a region of the longitudinal extension of the throat, viewed in the direction from the confuser to the diffuser.

Advantageous Effects of the Invention

Improvement of the separation rate is achieved in an inventive venturi scrubber with throat by means of at least one insert body in the throat, which is to say in the flow channel of the throat. Preferably the flow cross-section is reduced in the flow channel with insert body installed by at least 15% and at most 45%, preferably at most 30%, particularly preferably at most 20%, for example in a throat having a rectangular cross-section and a width of 0.35 m. Preferably the insert body is located after the nozzles in a region of the longitudinal extension of the throat, viewed in the direction from the confuser to the diffuser. An extreme reduction of 45% comes into consideration for example when a particularly thorough cleaning of the gas stream is intended to be achieved, since then the gas stream is particularly intensively wetted by the scrubbing liquid.

It has been realized that with traditionally used, in some cases also standardized, throats, a flow cross-section of the flow channel in the throat of, for example, approx. 350 mm, is so wide that when scrubbing liquid is injected at typically used scrubbing liquid volumes, the central region of the flow cross-section is not reached by the scrubbing liquid. If an insert body is inserted into said region that is not covered, a gas stream cannot flow along there any longer, and consequently cannot evade being cleaned there through interaction with scrubbing liquid.

In addition there is the advantage that with a flow cross-section reduced by the insert body, the velocity of the gas stream is higher, with the result that the relative velocity between the scrubbing liquid and the gas stream requiring to be cleaned is higher.

A particularly advantageous aspect of this solution is that existing installations can also be retrofitted with such an insert body.

According to a preferred embodiment variant, the insert body is of modular design. The modules comprise a base body and at least one shield which can be mounted thereon. With the embodiment variant, removable shields can be mounted onto the insert body, thereby further constricting the flow cross-section of the flow channel in the throat to a defined dimension. In that embodiment variant, the insert body is a modular structure, wherein the modules comprise a base body and shields which can be mounted thereon. The insert body can consist of the base body module alone, or it can be comprised of a base body module having at least one shield module mounted thereon. Shields of different thickness can be provided so that the insert body can be used with different diameters through combination of shields of different thickness with the base body. By using shields of different thickness, it is possible to adapt the flow cross-section left free by the insert body in the throat to different operating states. For example, the gas generation in a converter can deviate from the values for which a specific base body is dimensioned, due, for example, to smaller blow volumes of oxygen or a reduction in the pig iron charge. The velocity of the gas stream in the throat would then decrease. This decrease can be counteracted by mounting a shield module onto the base body and thereby reducing the flow cross-section.

In an inventive venturi scrubber having a throat and insert body, the separation rate can additionally be improved if at least one of the nozzles, preferably a plurality of the nozzles, particularly preferably all of the nozzles, are inclined at an acute angle to the longitudinal axis of the flow channel in the direction of the confuser.

If the nozzles are inclined at an acute angle to the longitudinal axis of the flow channel in the direction of the confuser, the scrubbing liquid is injected at an acute angle counter to the flow direction of the gas stream requiring to be cleaned. It has surprisingly been discovered that by injecting the scrubbing liquid at an acute angle to the flow direction of the gas stream requiring to be cleaned, it was possible to increase the separation rate quite substantially for the same volume of injected scrubbing liquid. This is attributed to the fact that by injecting counter to the flow direction, a higher relative velocity between the droplets of the scrubbing liquid is achieved on the one hand, and on the other hand the penetration depth of the scrubbing liquid into the flow channel is significantly increased, such that a greater surface area of the flow channel cross-section is covered by the scrubbing liquid.

It is of advantage if the nozzles form an angle in a range having a lower bound of at least 20°, preferably at least 30°, and an upper bound of at most 70°, preferably at most 60°, with the longitudinal axis of the flow channel of the venturi scrubber, and hence with the flow direction of the gas stream requiring to be cleaned that is flowing through the venturi scrubber along the flow channel. Preferred ranges are 20°-70° and 30°-60°. Particularly preferably, an angle of 45° is formed.

In venturi scrubbers with throat according to the prior art, adjustable flaps are typically provided in the throat in the flow direction upstream of the nozzles, specifically in the inlet region of the throat. The inlet region of the throat is understood as an area of the throat adjoining the confuser and adjoining the area of the throat in which the nozzles are present. The adjustable flaps can be pivoted such that in a pivoted position, when viewed in the flow direction of the gas stream, along the flow channel in the direction from the confuser to the diffuser, they cause an increasing tapering of the flow cross-section in the flow channel.

This enables the flow cross-section in the inlet region of the throat to be adjusted to the volumetric flow rate of a fed-in gas stream in order for example to ensure a specific velocity of the gas stream.

Adjustable flaps according to the prior art, when viewed along the flow channel in the direction from the confuser to the diffuser, end significantly, i.e. depending on opening position at for example a width standard dimension of 0.35 m of the rectangular cross-section of the throat 180-200 mm, before the plane in which the nozzles are arranged, that is, the injection plane in the prior art.

In addition to the inventive arrangement of the nozzles, the separation rate of a venturi scrubber with throat and insert body can also be improved wherein the length of the adjustable flaps is chosen such that during operation of the venturi scrubber, they do not quite come into contact with the injected scrubbing liquid. Thus, the adjustable flaps are longer than in the case of venturi scrubbers known from the prior art, in which the adjustable flaps end significantly before the plane of the nozzles in the flow direction. In their position not swiveled into the throat, called the throat wall position, when viewed in the direction from the confuser to the diffuser along the longitudinal axis of the flow channel, the adjustable flaps advantageously end before the plane in which the nozzles are arranged, with a separation distance in a range having the upper limit value 175 mm, preferably 150 mm, particularly preferably 125 mm, quite particularly preferably 100 mm, and a lower limit value of 20 mm, preferably 10 mm, particularly preferably 5 mm, quite particularly preferably 2 mm.

It has namely been surprisingly discovered that in traditional venturi scrubbers the gas stream is widened due to the resistance of the injected scrubbing liquid after exiting the region of the flow channel narrowed by means of the adjustable flaps—also referred to hereinbelow as the gas outlet at the adjustable flaps—such that the flow velocity of the gas when the gas stream impinges on the injected scrubbing liquid is less than at the gas outlet at the adjustable flaps. As a result the relative velocity between scrubbing liquid and gas stream—or, as the case may be, particles to be collected in the gas stream—is less than it might be at a given velocity of the gas stream upon entering a constriction of the flow channel in the throat brought about by the swiveled-in adjustable flaps. However, if the adjustable flaps end—as far as possible—precisely before the point in the flow channel at which the gas stream can impinge for the first time on the injected scrubbing liquid, a higher relative velocity can be achieved between the injected scrubbing liquid and the gas stream requiring to be cleaned, thereby increasing the separation rate compared to traditional venturi scrubbers with throat and adjustable flaps.

Existing installations can be equipped comparatively easily with longer adjustable flaps and optimized in a simple manner by means of said retrofit.

In a further preferred embodiment of the inventive venturi scrubber with throat and insert body, the nozzles for injecting scrubbing liquid into the throat are arranged one after the other in at least two, preferably in four, planes in the direction from the confuser to the diffuser when viewed along the longitudinal axis of the venturi scrubber. In this case some or all of said planes lie preferably perpendicularly to the longitudinal axis of the flow channel, in other words are cross-sectional planes of the flow channel formed by the throat. Adjacent nozzle planes are spaced apart from one another in the direction of the longitudinal axis of the flow channel by a distance in the order of preferably 200 mm to 300 mm, particularly preferably 200 mm, quite particularly preferably 220 mm.

Preferably the nozzles of planes lying one after the other in the direction of the longitudinal axis of the flow channel are arranged offset with respect to one another around the circumference of the throat—viewed in the direction of the longitudinal axis of the flow channel. Therefore, at least the nozzles of two directly adjacent planes do not lie directly after one another, but rather the nozzles of a second plane are located in segments of the circumference that represent an interspace between adjacent nozzles of the first plane. What is achieved thereby is that the dead zones lying between the nozzles of a cross-sectional plane of the flow channel, which dead zones are not reached by the scrubbing liquid injected out of said nozzles, are reached by the scrubbing liquid injected out of nozzles of a following cross-sectional plane.

Preferably the nozzles of one plane can be switched on and/or off independently of the nozzles of other planes. The different rows of nozzles can then be switched on or off individually.

A further subject matter of the invention is the use of an inventive venturi scrubber for cleaning converter gas, in other words waste gas accumulating during steelmaking.

In order to improve the separation rate of venturi scrubbers with throat according to the prior art it is therefore proposed according to the invention, a) to insert an insert body into the throat in order to reduce the flow cross-section and thereby increase the coverage of the flow cross-section with scrubbing liquid, and if necessary b) to arrange the pitch of the nozzles in the throat of the venturi scrubber at an acute angle to the longitudinal axis of the venturi scrubber—which coincides with the longitudinal axis of the flow channel—, and/or c) to increase the length of the adjustable flaps in the throat of the venturi scrubber.

By means of the inventive measures it is possible to achieve separation rates which lie quite substantially above those of known prior art venturi scrubbers; in other words, less dust load is present in the cleaned gas than in the case of known prior art venturi scrubbers. Thus, the mean value of the dust load of the clean gas can be reduced in converter plants to approximately 50 mg/m$^3_n$, or less—up to less than 20 mg/m$^3_n$. This means that complex and costly downstream filter systems can be dispensed with.

BRIEF DESCRIPTION OF THE DRAWINGS

The invention is explained in more detail below with reference to schematic exemplary figures relating to the prior art and to exemplary embodiment variants of the invention, in which.

DESCRIPTION OF PRIOR ART EMBODIMENTS AND THE EMBODIMENT VARIANTS OF THE INVENTION

Figure 1:
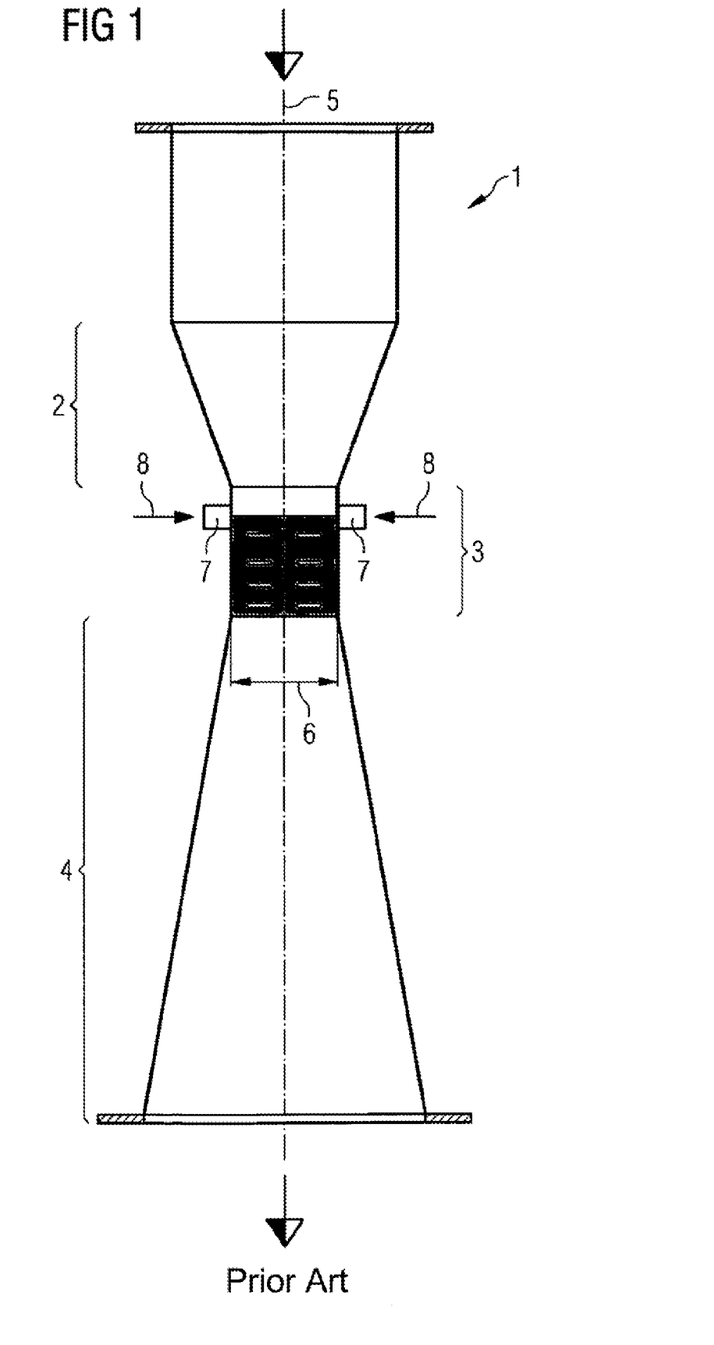
FIG. 1 shows a conventional venturi scrubber.

FIG. 1 shows the typical structure of a conventional venturi scrubber 1 with lateral injection. The gas stream requiring cleaning are indicated by the arrows with half-filled head flowing in the flow direction from top to bottom in FIG. 1 through the venturi scrubber 1. In so doing it passes in succession through the region of the pyramidal, taperingly shaped confuser 2, the region of the narrowed throat 3 and the region of the pyramidal wideningly shaped diffuser 4 of the venturi scrubber 1, which together define the flow channel. The longitudinal axis 5 of the gas flow channel coincides with the longitudinal axis of the venturi scrubber 1 which corresponds, when viewed in the direction from the confuser 2 to the diffuser, to the flow direction of the gas stream. As illustrated, the flow cross-section in the different regions is rectangular, though in principle it could also be a different shape. The width 6 of the throat 3, and hence the flow cross-section available for the flow, is smaller compared to the width and the flow cross-section of the flow channel at the inlet of the confuser 2 for the gas stream and the width and the flow cross-section of the flow channel at the outlet of the diffuser 4 for the gas stream. This causes the velocity of the gas stream to be greatest in the vicinity of the throat 3. Nozzles 7 for injecting a scrubbing liquid 8, typically water, are provided in the vicinity of the inlet of the throat 3 for the gas stream. The relative velocities between the scrubbing liquid 8 and the inflowing gas streams is highest immediately at the level of the nozzles, where the greatest proportion of particles contained in the gas stream can be collected by the scrubbing liquid 8. The scrubbing liquid is accelerated by the gas stream in the flow direction, so that their relative velocities decrease. The more the relative velocities between gas stream and scrubbing liquid 8 are reduced, the fewer particles are taken up by the scrubbing liquid 8 in the further course of flow. The zone of high relative velocity in the throat 3 is indicated by a gray background.

Figure 2:
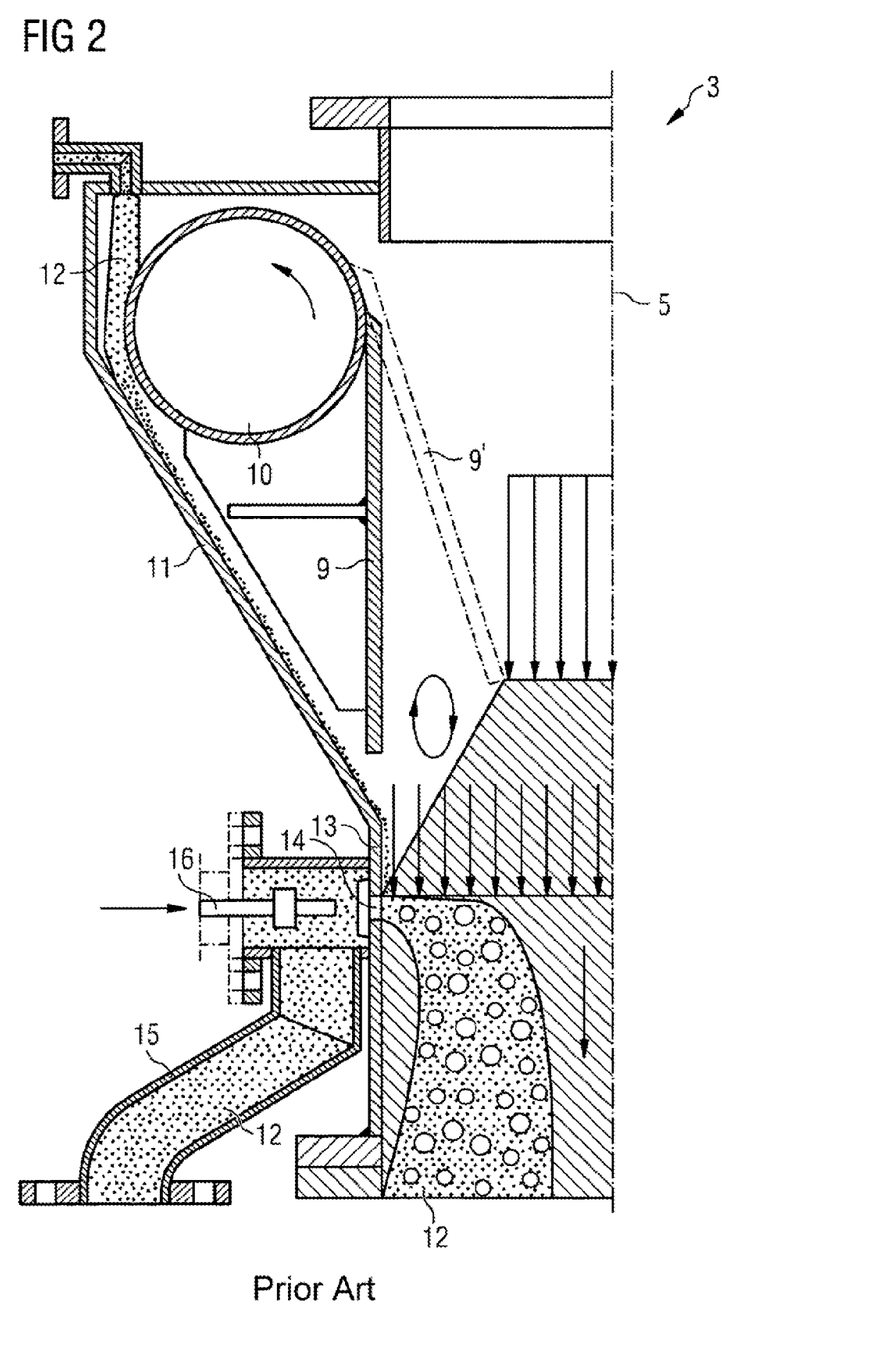
FIG. 2 shows a partial section through a throat of a conventional venturi scrubber.

FIG. 2 shows a half-side longitudinal section through a throat 31 of a traditional venturi scrubber 1. The other half may be a mirror image. In order to enable the flow cross-section of the flow channel in the throat to be adjusted to a change in the volumetric flow rate of the gas stream, adjustable flaps 9 are arranged on opposite sides of the flow channel in the throat 3. Said flaps are fixed to a shaft 10 and can be swiveled into the flow channel, as indicated by the adjustable flap 9' shown in a swiveled-out position. Only one side of the flow channel is depicted in FIG. 2. On the side of the throat 3 after the adjustable flap 9 there is provided an oblique throat housing wall section 11 which is largely covered by the adjustable flap 9 in the non-swiveled-out position. Provided above said throat housing wall section 11 is a scrubbing liquid inlet 12 via which scrubbing liquid 12 is admitted into the throat 3. The scrubbing liquid 12 flows downward from there as a film along the throat housing wall section 11 and enters the flow channel below the adjustable flap 9. A plurality of horizontal nozzles 14 are arranged horizontally adjacent to one another in the vertical throat wall 13 below the throat housing wall section 11. Said nozzles serve to inject scrubbing liquid 12 horizontally into the flow channel of the throat 3. Only one nozzle is shown in the detail according to FIG. 2. The nozzles 14 are charged in each case with scrubbing liquid 12 by way of a respective scrubbing liquid line 15 and can be cleaned when necessary by means of plungers 16 provided for that purpose.

When an adjustable flap 9' is swiveled into the flow channel, the typical flow profile of the gas stream requiring scrubbing is represented from the gas outlet on the adjustable flap 9' as a hatched area with arrows, and the course of the injected scrubbing liquid 12 as an area provided with circles. It can be seen that when scrubbing liquid is injected the central region of the flow cross-section is not reached by the scrubbing liquid. This region, through which part of the gas stream flows, and which is therefore not subjected there to cleaning through interaction with scrubbing liquid, is also referred to as the dead zone.

Figure 3:
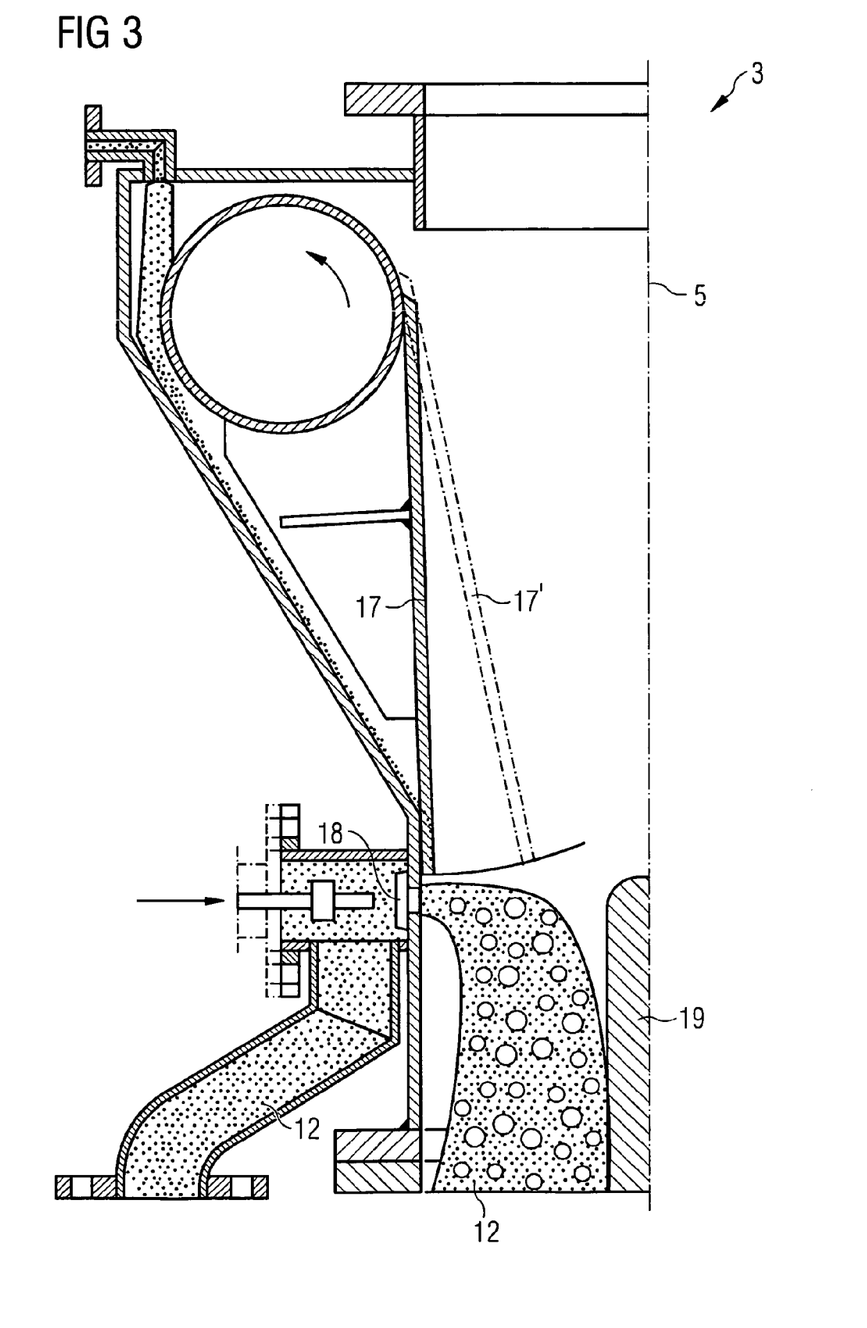
FIG. 3 shows a partial section through a throat of an embodiment variant of a venturi scrubber according to the invention.

FIG. 3 shows an exemplary embodiment variant of a throat 3 according to the present invention. Like the throat 3 shown in FIG. 2, it has, in essentially the same arrangement, a flow channel, adjustable flap 17 which is fixed to a shaft and can be swiveled into a position of the adjustable flap 17', an oblique throat housing wall section, a scrubbing liquid inlet, a vertical throat wall in which nozzles 18 are arranged horizontally adjacent to one another, scrubbing liquid lines for charging the nozzles 18, and plungers for cleaning the nozzles 18. For clarity of illustration reasons, reference signs for parts analogous to FIG. 2 have largely been omitted.

In contrast to FIG. 2, an insert body 19 has been inserted into the central flow region of the flow channel of the throat 3, the flow cross-section being covered by said insert body 19 in a central region, such that no dead zone, as present in FIG. 2, can exist there. What is achieved in this case by means of the central insert body 19 is that the injected scrubbing liquid 12 can reach and cover the entire flow cross-section between nozzle 18 and insert body 19. In addition, due to the reduction in the flow cross-section, the flow velocity of the gas—and consequently the relative velocity between injected scrubbing liquid 12 and gas stream—is increased. This inventive measure for improving the separation rate is particularly easy to retrofit, since the throat 3 only has to be supplemented by one additional component.

A further difference between FIG. 2 according to the prior art and FIG. 3 according to the invention consists in longer adjustable flaps 17. In the swiveled-out position, the adjustable flap 17' reaches as far as the boundary of the course of the injected scrubbing liquid 12; the adjustable flap 17' comes almost but not quite into contact with the scrubbing liquid. It has surprisingly been discovered that by means of this measure the separation rate can be improved in a particularly simple way. The improvement in the separation rate can be explained by the fact that the flow cross-section is smallest at that point and hence the flow velocity of the gas stream is greatest precisely in that region in which the gas stream comes into contact with the scrubbing liquid for the first time. The greatest possible difference in velocity between gas stream and scrubbing liquid is exploited thereby. In contrast, the flow velocity at the end of the adjustable flap 9' in FIG. 2 is greater than when the gas stream impinges on the course of the injected scrubbing liquid 12 in FIG. 2, since there the flow has already widened. The widening is additionally assisted by the flow after the adjustable flap 9' being turbulated, as indicated in FIG. 2 by means of a circle arrow.

Figure 4:
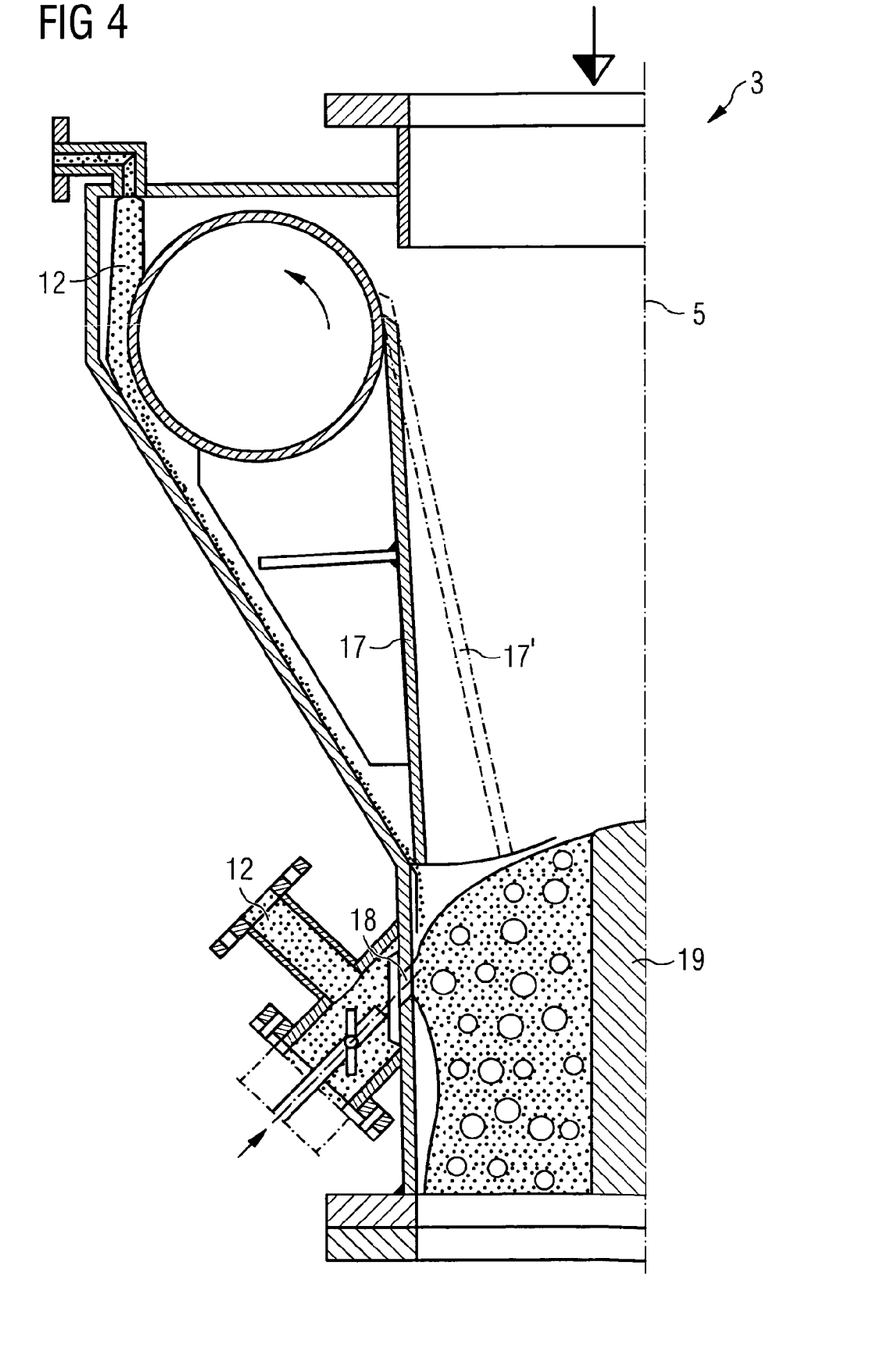
FIG. 4 shows a partial section through a throat of a further embodiment variant of a venturi scrubber according to the invention.

FIG. 4 shows an embodiment variant of the invention that is largely analogous to FIG. 3. In contrast to FIG. 2, the nozzles 18 are inclined at an acute angle $\alpha$ of 45° with respect to the longitudinal axis of the flow channel. Two effects are achieved thereby in comparison with the prior art. Since the injected scrubbing liquid 12, upon entering the flow channel, has a motion component that is opposite to the flow direction of the gas stream, the relative velocities between the gas stream requiring to be scrubbed and the scrubbing liquid 12, given the same liquid volume and same injection pressure, is higher than in the case of the horizontal injection as shown in FIG. 3. Furthermore, the scrubbing liquid 12 is injected deeper into the flow channel than in the case of horizontal injection. Accordingly, the diffusion of particles from the gas stream into the scrubbing liquid 12 is improved on the one hand, while on the other hand there is also a significant improvement in the spatial coverage of the flow cross-section.

The flow of the injected scrubbing liquid 12 is represented as an area provided with circles. In this case, too, it is ensured by means of the central insert body that the injected scrubbing liquid 12 can reach and cover the entire flow cross-section between nozzle 18 and insert body 19.

Figure 5:
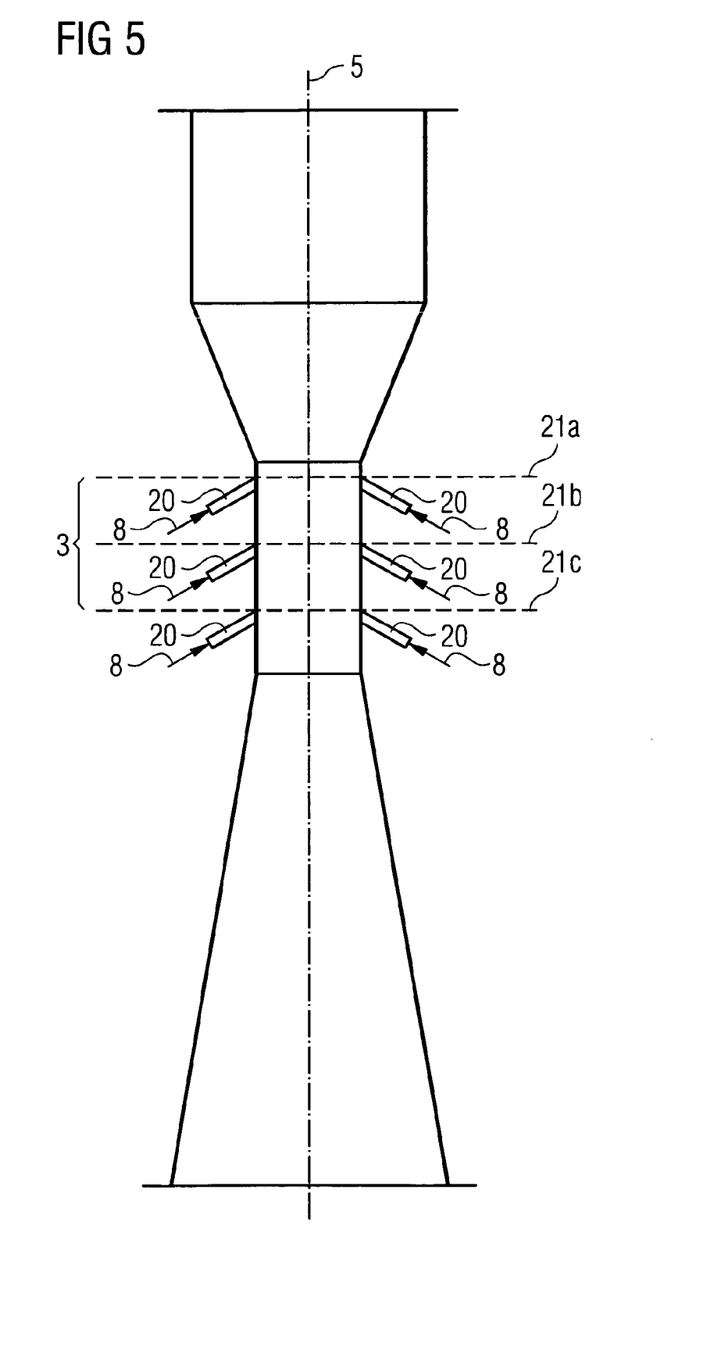
FIG. 5 shows the nozzles of a venturi scrubber according to the invention in different planes.

FIG. 5 shows in a view largely analogous to FIG. 1 how the nozzles 20 for injecting scrubbing liquid are arranged into a plurality, in this case three, planes 21a, 21b, 21c. Viewed along the longitudinal axis 5 of the venturi scrubber from the confuser to the diffuser, the planes 21a, 21b, 21c are arranged one after the other. They all lie perpendicularly to the longitudinal axis 5, i.e. are cross-sectional planes of the flow channel in the throat 3.

The distance separating the planes from one another in the direction of the longitudinal axis 5 is 200 mm in each case. The nozzles of one plane can be switched on and off independently of the nozzles of other planes.

Figure 6:
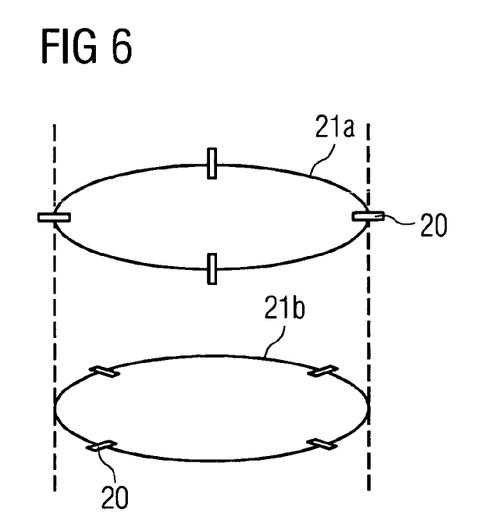
FIG. 6 shows an oblique view of the nozzle planes with offset nozzles.

FIG. 6 schematically shows in an oblique view an offset arrangement of nozzles in the two planes 21a and 21b of FIG. 5. In order to avoid dead zones in the gas stream that are not reached by scrubbing liquid, the nozzles 20 in plane 21b are arranged in segments of the circumference of the throat which represent an interspace between the nozzles in plane 21a.

Figure 7:
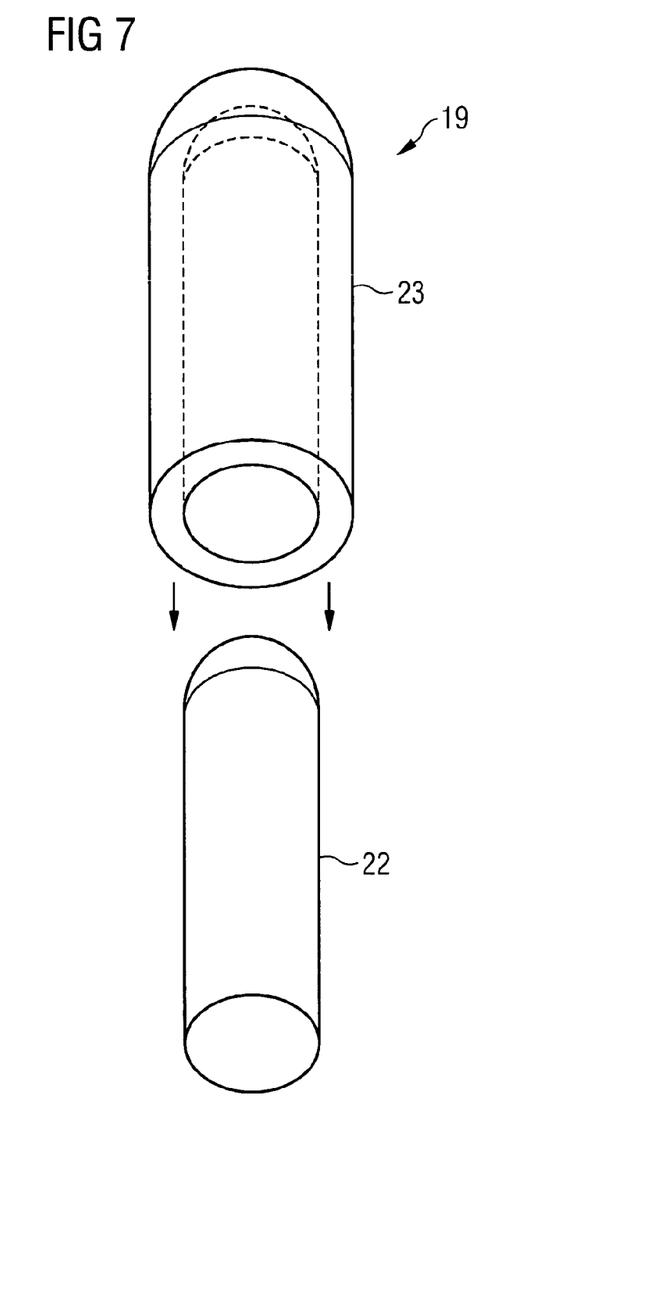
FIG. 7 shows an insert body.

FIG. 7 schematically shows an insert body 19 having a modular structure. A module shield 23—which is mountable and demountable—is placed onto a module base body 22. The insert body 19 consists of module base body 22 with module shield 23 mounted thereon. It could also consist of the module base body 22 alone.

Basically, shields of different thickness can be provided to enable the insert body to be used with different diameters by combining shield modules of different thickness with the base body.

Although the invention has been illustrated and described in detail on the basis of the preferred exemplary embodiments, the invention is not limited by the examples disclosed and other variations can be derived herefrom by the person skilled in the art without departing from the scope of protection of the invention.

LIST OF REFERENCE SIGNS

1 Venturi scrubber
2 Confuser
3 Throat
4 Diffuser
5 Longitudinal axis of the flow channel
6 Width of the throat 3
7 Nozzle
8 Scrubbing liquid
9,9' Adjustable flap
10 Shaft
11 Throat housing wall section
12 Scrubbing liquid
13 Vertical throat wall
14 Horizontal nozzle
15 Scrubbing liquid line
16 Plunger
17,17' Adjustable flap
18 Nozzle
19 Insert body
20 Nozzle
21a,21b,21c Planes
22 Base body
23 Shield

The invention claimed is:

1. A venturi scrubber having a flow channel along a longitudinal axis and defined in sequence by a confuser, a throat and a diffuser;
wherein the throat has a surrounding throat wall, and nozzles configured for injecting scrubbing liquid into the throat are present in the throat wall;
at least one insert body in the throat and shaped for reducing the flow cross-section in the flow channel by at least 15% and at most 45%, wherein viewed in a direction from the confuser to the diffuser, the insert body is located after the nozzles in a region of a longitudinal extension of the throat;
the nozzles for injecting scrubbing liquid into the throat are arranged in at least two planes, one plane after the other when viewed in the direction from the confuser to the diffuser along the longitudinal axis of the venturi scrubber; and
wherein the respective nozzles in each of the planes that lie one after the other in the direction of the longitudinal axis of the flow channel are arranged around the circumference of the throat circumferentially offset with respect to the nozzles in another of the planes.

2. The venturi scrubber as claimed in claim 1, wherein the nozzles in one plane can be switched on and/or off independently of the nozzles in others of the planes.

3. The venturi scrubber as claimed in claim 1, wherein the nozzles are arranged in four of the planes.

4. The venturi scrubber as claimed in claim 1, wherein the insert body is shaped for reducing the flow cross-section in the flow channel by at most 30%.

5. The venturi scrubber as claimed in claim 1, wherein the insert body is shaped for reducing the flow cross-section in the flow channel by at most 20%.

6. The venturi scrubber as claimed in claim 1, wherein the nozzles are placed with a distance of 200 mm between two adjacent planes.

7. The venturi scrubber as claimed in claim 1, wherein the insert body is of a modular design, with each module comprising a base body and at least one shield which is mounted on the base body.

8. The venturi scrubber as claimed in claim 1, wherein at least one of the nozzles is inclined at an acute angle to the longitudinal axis of the flow channel, viewed in the direction of the confuser.

9. The venturi scrubber as claimed in claim 1, wherein a plurality of the nozzles are inclined at an acute angle to the longitudinal axis.

10. The venturi scrubber as claimed in claim 1, wherein all of the nozzles are inclined at an acute angle to the longitudinal axis.

11. The venturi scrubber as claimed in claim 9, wherein the nozzles form an angle of 20°-70° to the longitudinal axis.

12. The venturi scrubber as claimed in claim 9, wherein the nozzles form an angle of 30°-60° to the longitudinal axis.

13. The venturi scrubber as claimed in claim 9, wherein the nozzles form an angle of at most 60° to the longitudinal axis.

14. The venturi scrubber as claimed in claim 9, wherein the nozzles form an angle of 45° to the longitudinal axis.

15. The venturi scrubber as claimed in claim 9, wherein each of the inclined nozzles forms an angle in a range having a lower bound of at least 20° and an upper bound of at most 70° with the longitudinal axis of the flow channel of the venturi scrubber.

16. The venturi scrubber as claimed in claim 1, further comprising adjustable flaps in the throat, the flaps having a length such that during the operation of the venturi scrubber, the flaps do not come into contact with the injected scrubbing liquid.

17. A venturi scrubber as claimed in claim 1, connected with a source of converter gas to be cleaned.

* * * * *